(12) United States Patent
Bulpitt

(10) Patent No.: US 7,022,969 B2
(45) Date of Patent: Apr. 4, 2006

(54) LED MEASURING DEVICE

(75) Inventor: Thomas H. Bulpitt, Westchester, CA (US)

(73) Assignee: Photo Research, Inc., Chatsworth, CA (US)

( * ) Notice: Subject to any disclaimer, the term of this patent is extended or adjusted under 35 U.S.C. 154(b) by 140 days.

(21) Appl. No.: 10/848,707

(22) Filed: May 14, 2004

(65) Prior Publication Data

US 2005/0253046 A1    Nov. 17, 2005

(51) Int. Cl.
*H01J 3/14* (2006.01)
(52) U.S. Cl. ...................... 250/216; 250/548
(58) Field of Classification Search .............. None
See application file for complete search history.

(56) References Cited

U.S. PATENT DOCUMENTS 5,627,362 A * 5/1997 Youngquist et al. ........ 250/205

OTHER PUBLICATIONS

CIE Commission International De L'Eclairage Technical Report: "Measurement of LEDs" (1997).

"The OL 770-LED- High Speed LED Measurement System For Light Emitting Diodes", (Software, Measurement Accessories & Information Request)—Optronic Laboratories—www.onlinet.com.

"The Entire Spectrum of Optical Analysis"—Instrument Systems (www.instrumentsystems.de).

* cited by examiner

*Primary Examiner*—Que T. Le
(74) *Attorney, Agent, or Firm*—Darby & Darby

(57) ABSTRACT

A device for measuring the output of an LED with a detector under different distance conditions without requiring the movement of either the LED or the detector. An exemplary embodiment of the present invention implements the testing conditions specified in CIE 127 allowing the determination of Averaged LED Intensity at the specified distances of 100 mm and 316 mm while keeping the physical distance between the LED and the detector fixed at the shorter distance of 100 mm. The exemplary embodiment comprises an optical element that can be selectively inserted into the optical path between the LED and the detector to make the separation appear to be the longer of the two distances. The optical element comprises a lens assembly and a detector aperture that creates a virtual image of the detector aperture at the longer of the two distances. The detector aperture is dimensioned so that the virtual image of the detector aperture has the area required by the standard.

15 Claims, 4 Drawing Sheets

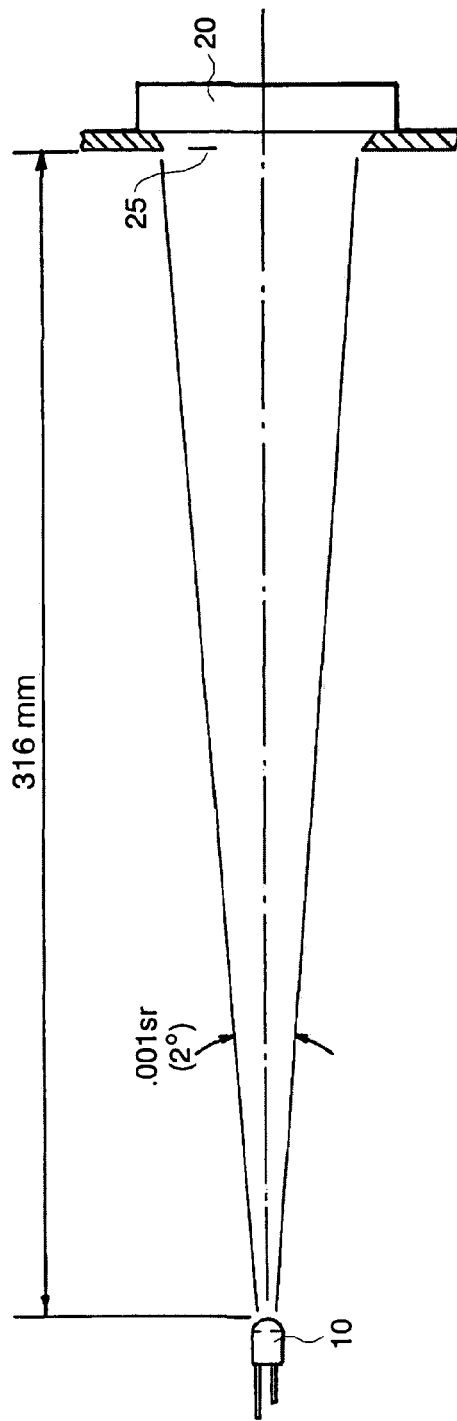
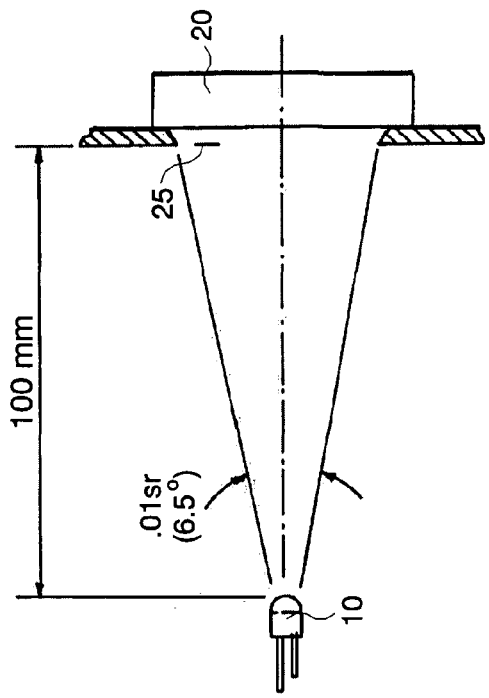
FIG. 1A
FIG. 1B

LED MEASURING DEVICE

FIELD OF THE INVENTION

The present invention relates generally to methods and apparatus for measuring characteristics of light emitting devices, and more particularly for measuring the intensity of light emitting diodes (LEDs).

BACKGROUND INFORMATION

Light emitting diodes (LEDs) are one type of semiconductor devices which emit optical radiation. LEDs are manufactured for a wide variety of applications with a wide range of radiometric, photometric and colorimetric characteristics.

In order to properly characterize the wide variety of LEDs and to properly compare different LEDs, efforts have been made to define standards for determining their various characteristics. One such effort has been undertaken by the Commission International de l'Eclairage (CIE) and has been published as Technical Report 127 (hereinafter "CIE 127").

An important characteristic of LEDs that CIE 127 addresses is LED intensity. LEDs by their nature are directional light sources. That is, LEDs emit light in a narrow beam which is often broadened by diffusers or lenses. Near-field and far-field light measurements can yield quite varying results depending upon what detector areas are used and the distances between the detectors and the LEDs. Because different laboratories, users and manufacturers seldom agree on measurements of the same devices, the CIE has proposed a standard measurement technique that can be used to provide consistent results.

The measurement technique proposed in CIE 127 entails measuring the flux incident on a circular detector area of 100 mm$^2$ at distances of 100 mm and 316 mm from the LED under test. FIG. 1A shows standard measurement condition A and FIG. 1B shows standard measurement condition B. To ensure a standard circular detector area of 100 mm$^2$, a circular aperture 25 having an area of 100 mm$^2$ is arranged in front of the detector 20. (Note that FIGS. 1A and 1B are not to scale.) In condition A the aperture 25 is 316 mm from the LED 10 and in condition B the aperture 25 is 100 mm from the LED 10. The distance between the aperture 25 and the detector 20 is not critical so long as all of the light that passes through the aperture is detected by the detector 20.

Condition A corresponds to a solid angle of view of 0.001 steradian, which corresponds to an equivalent plane angle of approximately 2 degrees, and Condition B corresponds to a solid angle of view of 0.01 steradian, which corresponds to an equivalent plane angle of approximately 6.5 degrees. The measurements are referred to as Averaged LED Intensity and designated by the symbols $I_{LEDA}$ and $I_{LEDB}$, for the respective conditions. Each of these values is calculated as follows:

$$I_{LED} = E \times d^2, \quad \text{(Eq. 1)}$$

where E is the average illuminance measured at the detector and d is the distance between the LED and the detector (i.e., 100 mm or 316 mm).

To comply with the requirements of CIE 127, conventional measurement arrangements require the movement of either or both the LED 10 and the detector 20 in order to perform the necessary measurements at the two distances. A typical arrangement uses some sort of optical rail or bench which holds the LED and detector in alignment and allows one or both to be moved. The rail or bench must be contained within a light tight enclosure and internally baffled to prevent detection of reflected or scattered light from the walls of the enclosure under both distance conditions.

Because either or both of the LED and detector must be moved and suitable baffling maintained, such conventional instrumentation becomes bulky and cumbersome to operate for bench top measurements.

The present invention provides an arrangement that overcomes the aforementioned shortcomings of the known art.

SUMMARY OF THE INVENTION

The present invention provides apparatus and methods for measuring the output of an LED with a detector under different distance conditions without requiring the movement of either the LED or the detector. An exemplary embodiment of the present invention implements the testing conditions specified in CIE 127 allowing the determination of Averaged LED Intensity at the specified distances of 100 mm and 316 mm while keeping the physical distance between the LED and the detector fixed at the shorter distance of 100 mm. The exemplary embodiment comprises an optical element that can be selectively inserted into the optical path between the LED and the detector to make the separation appear to be the longer of the two distances. The optical element comprises a lens assembly and a detector aperture that creates a virtual image of the detector aperture at the longer of the two distances. The detector aperture is dimensioned so that the virtual image of the detector aperture has the area required by the standard.

These and other aspects of the present invention are described below.

BRIEF DESCRIPTION OF THE DRAWINGS

FIGS. 1A and 1B illustrate an LED intensity measurement arrangement under two different distance conditions.

DETAILED DESCRIPTION

In an exemplary embodiment of the present invention, an LED measurement device 100 is provided in which the distance condition between an LED 10 being measured and a detector 20 measuring the intensity of light output by the LED 10 can be varied without varying the actual distance between the LED 10 and the detector 20.

Figure 2A:
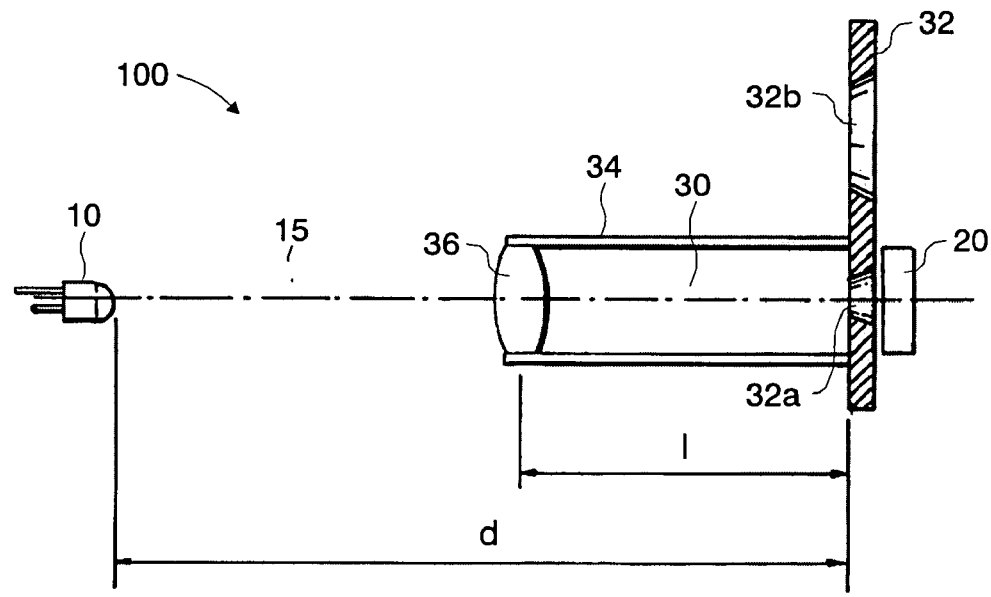
FIGS. 2A and 2B show schematic representations of an exemplary embodiment of a measurement device in accordance with the present invention in two different configurations providing different distance conditions between an LED and a detector without moving the LED or the detector.
Figure 2B:
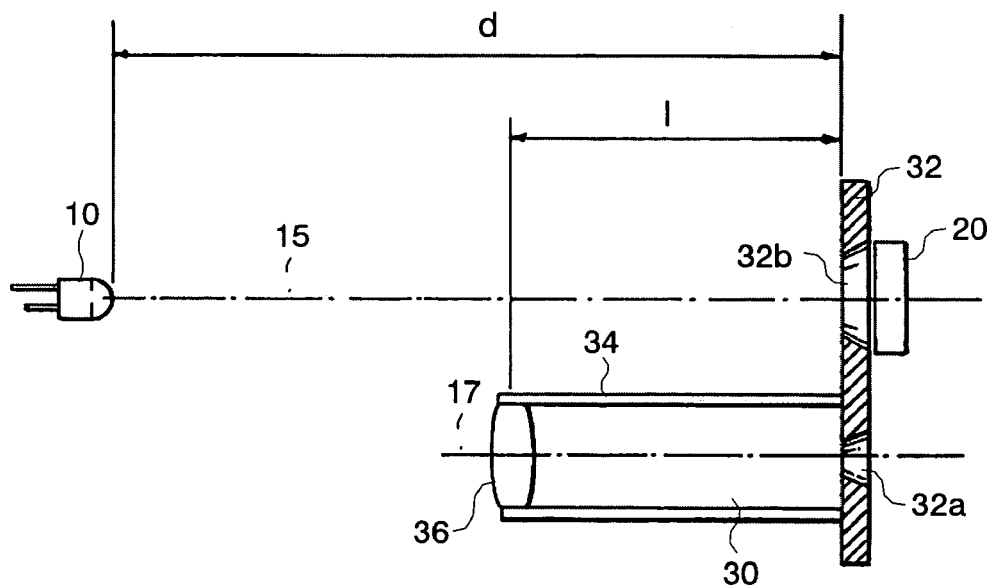

FIGS. 2A and 2B show schematic representations of an exemplary embodiment of a device 100 in accordance with the present invention in two different configurations. The configuration shown in FIG. 2A corresponds to a first distance condition (e.g., standard measurement condition A as specified by CIE 127) whereas the configuration shown in FIG. 2B corresponds to a second distance condition (e.g., standard measurement condition B as specified by CIE 127).

As shown in FIGS. 2A and 2B, the device 100 comprises an element 30 which can be moved relative to an optical axis 15 between an LED 10 and a detector 20 used to measure the output of the LED 10. The element 30, shown in cross-section, comprises a plate member 32, a lens 36, and a lens attachment member 34 for maintaining the lens 36 in a fixed relationship with the plate member 32.

The plate member 32 comprises a first aperture 32a and a second aperture 32b. The apertures 32a and 32b can be of any appropriate shape and area. In an exemplary embodiment of the present invention adapted to carry out the LED intensity tests specified in CIE 127, the apertures 32a and 32b are circular and have areas of approximately 3.4 mm$^2$ and 100 mm$^2$, respectively.

The lens 36 is held by the lens attachment member 34 at a fixed distance 1 from the aperture 32a with the optical axis 17 of the lens 36 aligned with the center of the aperture 32a. When the device 100 is in the configuration shown in FIG. 2A, the optical axis 17 of the lens 36 corresponds with the optical axis 15 and the aperture 32a lies in front of the detector 20. When the device 100 is in the configuration shown in FIG. 2B, the lens 36 and lens attachment member 34 are displaced away from the optical axis 15 and the aperture 32b lies in front of the detector 20. The device 100 can be placed in either configuration by sliding the element 30 transversely with respect to the optical axis 15, by rotating the element 30 about an axis parallel with the optical axis, or by any other suitable movement or mechanism. In an exemplary embodiment, the member 32 comprises a slide and an over-center spring mechanism holds the slide in either of the two positions shown in FIGS. 2A and 2B.

In both configurations, the LED 10 and the detector 20 are stationary with respect to each other and the distance between them is fixed. In the exemplary embodiment of the present invention used to carry out the intensity measurements specified in CIE 127, the distance d between the LED 10 and the plane of the apertures 32a and 32b is 100 mm.

When the lens 36 and the aperture 32a are in line with the optical axis 15 (FIG. 2A), substantially the same optical conditions are created as would be the case if the LED 10 and detector 20 were further apart. Although there is a transmission loss through the lens 36, this can be taken into account in the calibration of the detector 20 and/or in calculating the Averaged LED Intensity in Eq. 1. For example, the illuminance E can be corrected by dividing by the actual measured illuminance by the transmittance of the lens (which would typically be 0.92 to 0.98, in an exemplary embodiment).

In the exemplary embodiment for implementing the CIE 127 measurements, the lens 36 is selected and the aperture 32a is dimensioned so as to create the same conditions as if the LED 10 and detector 20 were 316 mm apart and the aperture area were 100 mm$^2$.

In an exemplary embodiment, the lens is an achromat lens with a focal length of 60 mm.

The various elements shown in FIGS. 2A and 2B are preferably arranged in a suitable light tight enclosure (see FIG. 4 below) comprising baffling and any other suitable elements.

Figure 3:
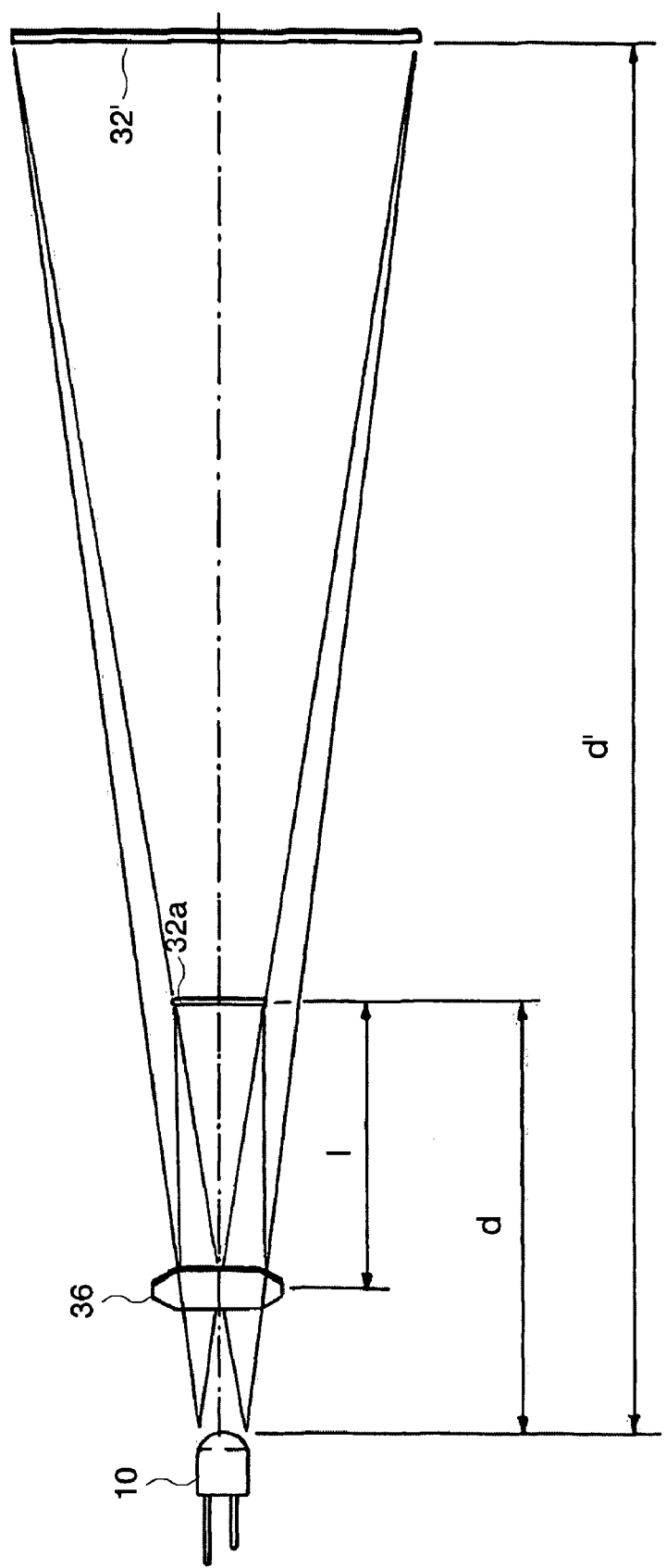
FIG. 3 shows a ray trace diagram of an exemplary embodiment of the present invention for creating an optical distance condition between an LED and a detector that is greater than the actual distance between the LED and the detector.

FIG. 3 shows a ray trace diagram which illustrates the operation of the lens 36 for providing the above-described conditions. The lens 36 and aperture 32a serve to provide the optical conditions of FIG. 1A without increasing the distance between the LED 10 and detector 20 from that of the configuration shown in FIG. 1B. As shown in FIG. 3, the lens 36 produces in the distance of FIG. 1B, the same ray paths as there would be under the distance condition of FIG. 1A. In another sense, the lens 36 creates a virtual image 32' of the aperture 32a. The virtual image 32' appears as though it is the same distance from the LED 10 as in FIG. 1A (e.g., d'=316 mm for the CIE 127 embodiment) and has an area as in FIG. 1A (e.g., 100 mm$^2$ for the CIE 127 embodiment).

As will be noted, merely replacing the aperture of FIG. 1A with a smaller aperture at a closer distance (e.g., 100 mm) so as to subtend a smaller solid angle of view (e.g., 0.001 sr) would not properly simulate the far-field condition of FIG. 1A. The far-field condition of the greater distance is provided by re-creating the same ray paths as the condition of FIG. 1A with the lens 36, as shown in FIG. 3.

As further shown in FIG. 3, the distance l between the lens 36 and the detector aperture 32a is determined in accordance with the following equation:

$$1/f = 1/l - 1/(d' - d + l) \qquad \text{(Eq. 2)},$$

in which f is the focal length of the lens 36, d is the distance between the LED 10 and the aperture 32a, and d' is the distance between the LED 10 and the virtual image 32' of the aperture 32a. In an exemplary embodiment of the present invention adapted to the CIE 127 measurements, d=100 mm, d'=316 mm, and f=60 mm, leading to a value of l of approximately 49 mm.

The area A of the aperture 32a is determined from the following relationship:

$$A = A'[l/(d'-d+l)]^2 \qquad \text{(Eq. 3)},$$

in which A' is the area of the virtual image 32' of the aperture 32a. For the exemplary embodiment of the present invention adapted to the CIE 127 measurements, A'=100 mm$^2$, in which case A is determined to be approximately 3.4 mm$^2$.

In an exemplary embodiment, it may be desirable to cause the LED light passing through the apertures 32a and 32b to be diffused to allow the light to be detected by a variety of detectors or photometric and radiometric instruments. Diffusers can be arranged in the apertures 32a and 32b for this purpose. The diffusers may be comprised of a suitable light diffusing material such as finely ground glass or opal glass.

The detector 20 may comprise a variety of devices including a PMT or silicon detector with a photometric or radiometric filter or instruments such as Photo Research instruments PR-880, PR705/715, or PR650, among others.

The apparatus 100 can be adapted to accommodate a wide variety of LEDs including T1 or T1-¾ (3 mm or 5 mm) LEDs, surface mount LEDs, and packaged LEDs, among others. The apparatus 100 can also be adapted to accommodate other types of light emitting devices as well.

Figure 4:
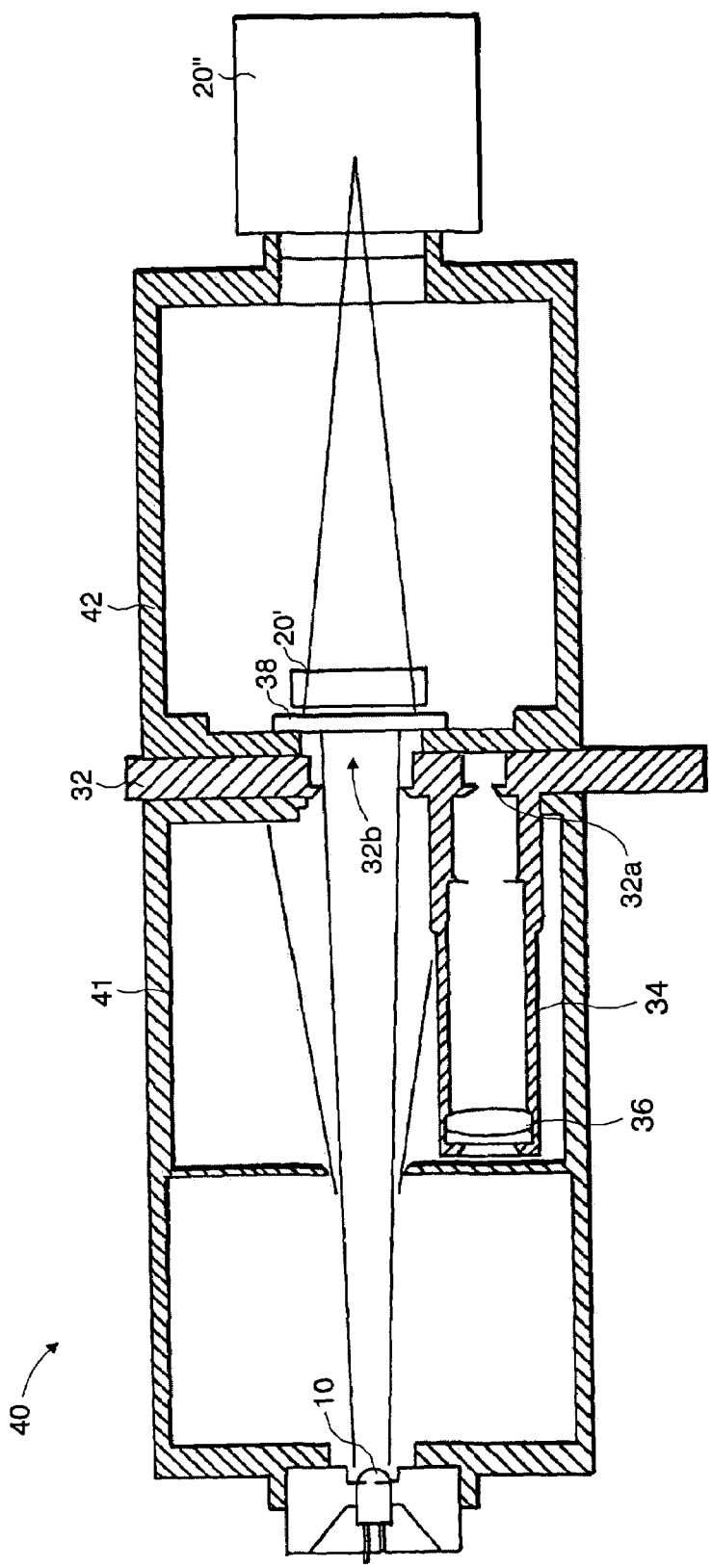
FIG. 4 shows an exemplary embodiment of a device in accordance with the present invention having an enclosure.

FIG. 4 shows an exemplary embodiment of a device 100 in accordance with the present invention including an enclosure 40. In the exemplary embodiment shown, the enclosure 40 comprises a first enclosure portion 41 and a second enclosure portion 42. The movable optical element 30 is slidably captured between the first and second enclosure portions 41, 42 with part of the member 32 extending to the exterior of the enclosure allowing external actuation of the element 30.

Diffusers 38a and 38b may be arranged in the apertures 32a and 32b, respectively or a diffuser 38 may be arranged as shown in the second enclosure portion 42.

The light detector 20 may be placed at several positions in the second enclosure portion 42, with the optimal position depending on the type of detector used. For instance, a large-area detector 20' can be arranged as shown adjacent to the aperture. A spot photometer 20" can be arranged as shown at a distance from the aperture.

A filter (not shown) may optionally be arranged between the diffuser 38 and the detector 20 or may be incorporated in the detector.

It is to be understood that while the invention has been described above in conjunction with preferred embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A device for selectively providing a plurality of optical measurement conditions between a light emitting device and a light detecting device, comprising:
   a movable optical element, the movable optical element including:
   a first aperture;
   a second aperture; and
   a lens, the lens having a lens optical axis and being arranged so that the first aperture lies along the lens optical axis,
   wherein the movable optical element is selectively movable between a first and a second position so that when the movable optical element is in the first position, the lens optical axis is collinear with a further optical axis between the light emitting device and the light detecting device and when the movable optical element is in the second position, the second aperture lies along the further optical axis.

2. The device of claim 1, wherein the lens creates a virtual image of the first aperture at a first distance from the light emitting device, the first distance being greater than a second distance between the light emitting device and the light detecting device.

3. The device of claim 2, wherein the virtual image of the first aperture has a virtual aperture area, the virtual aperture area being greater than an area of the first aperture.

4. The device of claim 2, wherein the first distance is approximately 316 mm and the second distance is approximately 100 mm.

5. The device of claim 3, wherein the virtual aperture area is approximately 100 mm$^2$.

6. The device of claim 1, wherein the second aperture has an area of approximately 100 mm$^2$.

7. The device of claim 1, wherein the first aperture has an area of approximately 3.4 mm$^2$.

8. The device of claim 1, wherein the movable optical element is movable in a direction transverse to an optical axis between the light emitting device and the light detecting device.

9. The device of claim 1, comprising a first light diffuser arranged proximate to the first aperture and a second light diffuser arranged proximate to the second aperture.

10. The device of claim 1, wherein the lens has a focal length of approximately 60 mm.

11. The device of claim 1, wherein the lens is approximately 49 mm from the first aperture.

12. The device of claim 1, wherein a solid angle of view between the light emitting device and the first aperture is approximately 0.001 steradian.

13. The device of claim 1, wherein a solid angle of view between the light emitting device and the second aperture is approximately 0.01 steradian.

14. The device of claim 1, wherein the light detecting device measures illuminance.

15. The device of claim 1, comprising a light tight enclosure, wherein the light emitting device, the light detecting device and the movable optical element are contained in the light tight enclosure.

* * * * *